United States Patent [19]
Taguchi

[11] Patent Number: 4,814,196
[45] Date of Patent: Mar. 21, 1989

[54] PROCESS FOR PREPARING FISH-CONTAINING SNACK FOOD

[75] Inventor: Gyota Taguchi, Yokohama, Japan

[73] Assignee: The Nisshin Oil Mills, Ltd., Tokyo, Japan

[21] Appl. No.: 945,737

[22] Filed: Dec. 23, 1986

[30] Foreign Application Priority Data

Dec. 23, 1985 [JP] Japan ................................ 60-291468

[51] Int. Cl.⁴ ............................................. A23L 1/325
[52] U.S. Cl. .................................... 426/643; 426/516; 426/517; 426/560; 426/656; 426/808
[58] Field of Search ................ 426/643, 516, 517, 560, 426/808, 656

[56] References Cited

U.S. PATENT DOCUMENTS 4,212,892  7/1980  Chahine et al. .................. 426/657 X
4,540,592  9/1985  Myer et al. ............................ 426/557

FOREIGN PATENT DOCUMENTS 54661   3/1985  Japan ................................... 426/643
  91965   5/1985  Japan ................................... 426/643
 199350  10/1985  Japan ................................... 426/802
1119172   6/1986  Japan ................................... 426/643

OTHER PUBLICATIONS

Shokuhin and Kagaku, vol. 26, No. 3, (1984).
"The food Industry", vol. 27, No. 14, (1984).

Primary Examiner—Donald E. Czaja
Assistant Examiner—Celine T. Callahan
Attorney, Agent, or Firm—Sughrue, Mion, Zinn, Macpeak & Seas

[57] ABSTRACT

Soybean proteins are added in a predetermined amount to the ground fish meat (surimi), and the mixture is kneaded, compressed, heated, and is molded into a sheet by a twin-screw extruder. The sheet-like mixture is then cut into flakes, followed by frying, to efficiently produce fish-containing snack that exhibits crunch feeling like that of potato chips, that is rich in proteins, and that tastes good.

7 Claims, 2 Drawing Sheets

PROCESS FOR PREPARING FISH-CONTAINING SNACK FOOD

BACKGROUND OF THE INVENTION

1. Field of the Invention

The present invention relates to a process for efficiently producing a novel snack food consisting chiefly of proteins using ground fish meat which is called surimi as a principal raw material, by using a twin-screw extruder.

2. Related Art Statement

A process for producing fish-containing snack has heretofore been known as disclosed in Japanese patent laid-open No. 54661/1985. According to this process, he ground fish meat (surimi) is mixed with soybean proteins, potato powder, seasonings and spices. The mixture is then kneaded, introduced into a casing or a retainer, frozen or heat-treated, sliced, and is then fried to obtain fish-containing chips.

According to this process, however, the raw materials must be sliced after they are mixed, introduced into the casing and are once heated or are frozen to solidify them. Therefore, this process necessitates a silent cutter for mixing the raw materials, a ribbon mixer, a stuffer for stuffing the casing with the raw materials that are mixed together, a device for heating or freezing the raw materials contained in the casing, and a slicer for slicing the solidified raw materials, causing the operation and the apparatus to become complex.

SUMMARY OF THE INVENTION

The object of the present invention is to provide a process for continuously and efficiently producing fish-containing snack food in large amounts, requiring reduced human labor and reduced-scale apparatus.

The inventors of the present invention have forwarded the study extensively, and have found the fact that the above object can be achieved if a twin-screw extruder is used under particular conditions.

The present invention was achieved based upon the above discovery, and provides a process for preparing fish-containing snack food in which ground fish meat (surimi) having a solids content of 20% by weight and a mixture consisting of 40 to 80% (unless otherwise specified all percentages hereafter refer to weight compared to solid content of fish meat, with weight of solid content of fish meat representing 100%) of soybean proteins, potato powder and seasonings and spices in suitable amounts, and, as required, starches, are mixed together in advance, and are supplied to a feed port of a twin-screw extruder, or said ground fish meat (surimi) and said mixture are separately supplied to the feed port of the twin-screw extruder, and are kneaded, compressed, heated just before they are extruded from the slit-like dies, and the mixture extruded in the form of a sheet is fried.

BRIEF DESCRIPTION OF THE DRAWINGS

The drawings illustrate in cross section the slit-like dies employed for putting the present invention into practice, wherein.

DETAILED DESCRIPTION OF THE INVENTION

Soybean proteins are added chiefly because of the following reasons. Namely, the ground fish meat (surimi) contains water in such a large amount that it does not provide such crunch feeling as that of when potato chips are crunched. However, the soybean proteins that are added absorb water to adjust the water content in the ground fish meat (surimi). Furthermore, the bonding force is lowered and the fish meat can be desirably textured by the twin-screw extruder. When fried, furthermore, the fish meat alone becomes very hard to crunch. With the soybean proteins being added, however, the fish meat becomes soft to eat. Condensed soybean proteins washed with alcohol are desirable because of their color and flavour. Also utilizable are soybean proteins separated from the condensed soybean proteins and soybean powders. The soybean proteins are added in an amount of from 40 to 80% by weight (8 to 16 parts by weight), preferably from 50 to 70% by weight, and particularly preferably from 55 to 70% by weight based on the solid content of the ground fish meat. If this range is exceeded, the fish meat becomes hard to eat and is not desirable.

The object of adding potato powder is to produce potato-like flavor and to produce generally soft taste. The potato powder should be added in an amount of from 20 to 45% by weight based on the solid content of the fish meat (i.e., 4 to 9 parts by weight potato powder based on 100 parts by weight of ground fish meat).

The seasonings and spices are added to impart desired taste and flavor to the products.

Starches can be used, as required, in order to further improve the crunch feeling in addition to the improvement by soybean proteins. Addition of the starches makes the crunch feeling of the product closer to that of the potato chips. Preferably, the starches should be added in an amount of 60 to 80% by weight based on the solid content of the fish meat (i.e., 12 to 16 parts by weight per 100 parts by weight of fish meat).

Figure 1:
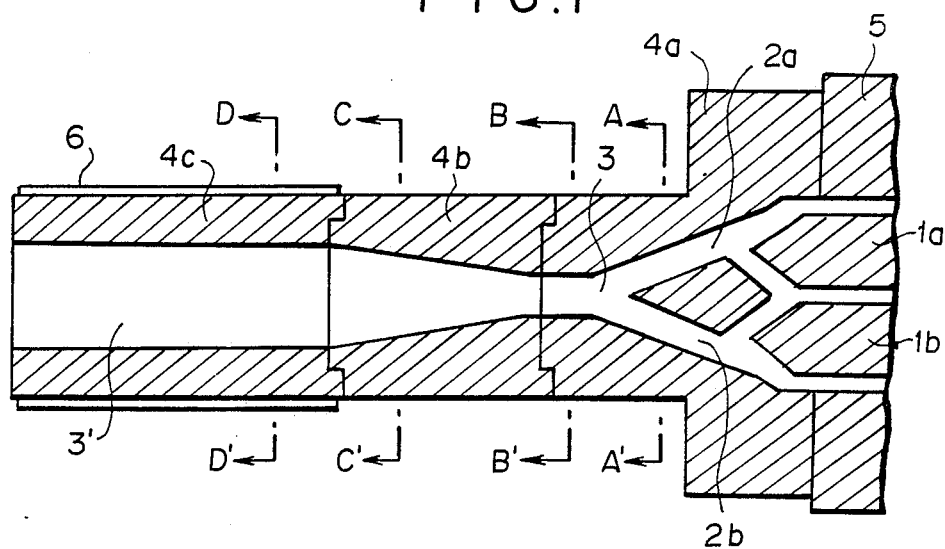
FIG. 1 is a plan view.
Figure 2:
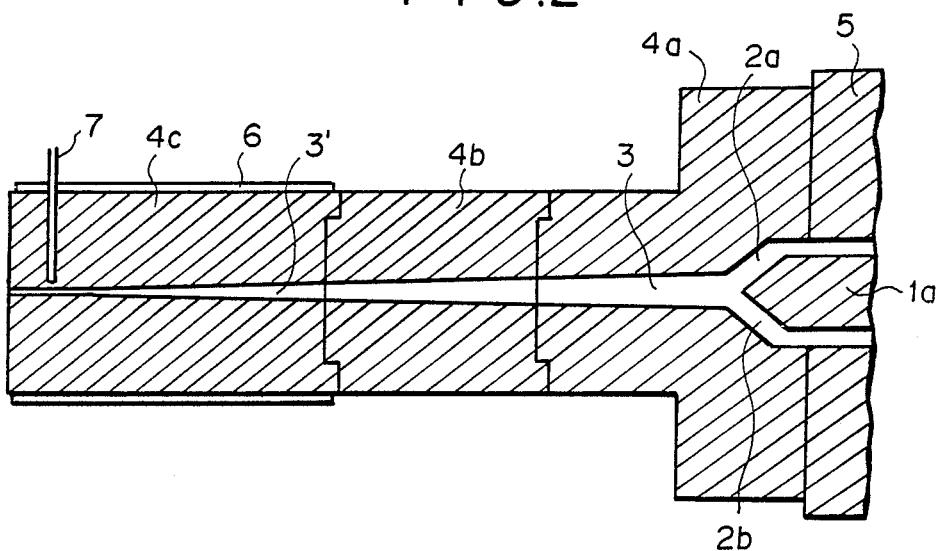
FIG. 2 is a side view.
Figure 3:
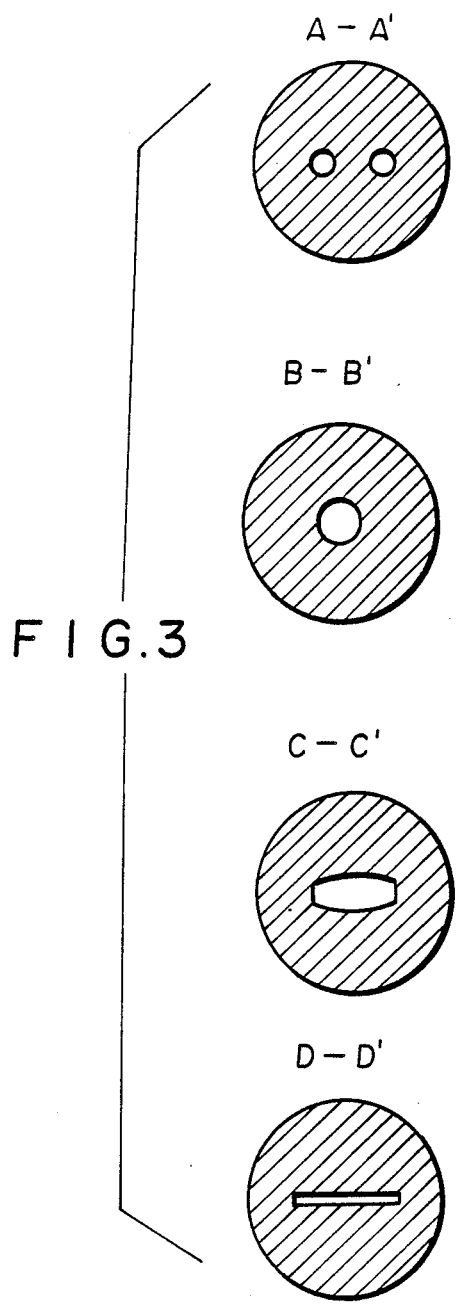
FIG. 3 is a section view of FIG. 1.

The twin-screw extruder employed in the present invention is equipped with two screws that are in mesh with each other in a barrel. Mixing, compressing, heating and cooling can be continuously carried out depending upon the shapes and combinations of the screws. According to the present invention, an end 5 of the barrel of the twin-screw extruder is provided with a dies which has slit-like holes. The dies should have a structure as shown in the drawings. In the dies 4a, 4b and 4c shown in the drawings, two holes (tunnels) 2a and 2b having a circular shape in cross section are provided at a place where the raw material kneaded and compressed on the right side of FIG. 1 flows in two streams and are extruded to the ends 1a and 1b of the screws. The two streams are then combined into one stream through a hole 3 located in front. Therefore, the stream of the raw material that flowed circularly due to the turn of the screws, is changed into a linear stream. The pressure just in front of the dies will be, for example, 5 to 40 kg/cm$^2$. On the front side of the hole 3, the tunnels becomes gradually narrow as shown in FIG. 3 to form slits 3' of a narrow rectangular shape in cross section. When extruded through the dies 4a, 4b and 4c of the above-mentioned structure, the raw material flows nearly in a direction in which it is extruded.

According to the present invention, use can be made of the dies of any other structure provided they produce the similar functions. Use can, further, be made of dies of a simple slit shape.

Ends of the dies are heated at 80° to 160° C., and the ground fish meat is extrusion-molded in the form of a sheet while permitting it to be solidified to some extent (in the case of the dies shown in the drawings, the end of the dies 4c is heated by a heater 6, and the temperature is controlled by a sensor 7). As required, furthermore, the thus molded raw material is drawn at a speed faster than the speed of extruding the raw material from the dies, thereby to obtain a sheet having a thickness smaller than that of the dies. The sheet is cut into a suitable length (5 to 10 cm) or is punched into circles of about 5 cm in diameter, followed by frying at 150° to 180° C. to obtain fish-containing snack that produces the crunch feeling like that of potato chips.

EXAMPLE 1

100 Parts (parts are all by weight hereinafter) of ground meat (surimi) of frozen walleye pollack of the second grade (water content of about 80%, and a solid content of about 20%), 10 parts of condensed soybean protein (water content of about 8%) obtained by the method of washing with alcohol, 2 parts of table salt, 4 parts of sugar, 2 parts of L-sodium glutamate, 0.1 part of ribotide, 10 parts of potato powder and 13 parts of potato starch were lightly mixed together using a silent cutter. The thus blended raw material was extrusion-molded into a sheet using a twin-screw extruder (model α-50, manufactured by Suehiro Steel Works Co., Japan) under the operation conditions shown in Table 1. The sheet was cut into a length of 10 cm and was fried at an oil temperature of 165° to 170° C. for three minutes to obtain a snack food. The food exhibited soft crunch feeling like that of potato chips, and also offered good taste and flavor.

TABLE I

| Operation conditions of the twin-screw extruder | |
|---|---|
| Twin-screw extruder | Screw diameter 50 mm Diameter ratio 24 |
| Number of revolutions of the shaft | 150 rpm (rotated in the same direction) |
| Raw material feed | 20 kg/hour |
| Cylinder temperature | 10° C. (adjusted with water) |
| Dies | Dies shown in the drawings |
| Dies slit (outlet) | 50 mm × 1 mm |
| Temperature at the dies end | 140° C. |
| Extrusion speed | 130 cm/min. |
| Drawing speed | 165 cm/min. |

COMPARATIVE EXAMPLE 1

100 Parts of ground meat (surimi) of frozen walleye pollack of the second grade (water content of about 80%) and 1 part of table salt were lightly mixed together using a silent cutter to obtain a snack food in the same manner as in Example 1. The food was hard and exhibited rough crunch feeling that was far from the crunch feeling of potato chips, and emitted strong odor of fish that was not desirable.

EXAMPLE 2

100 Parts of ground meat (surimi) of frozen walleye pollack of the second grade (water content of about 80%), and a mixture consisting of 13 parts of condensed soybean protein obtained by the method of washing with alcohol, 8 parts of potato powder, 15 parts of corn starch, 2 parts of table salt, 3 parts of sugar, 1 part of L-sodium glutamate, and 0.1 part of ribotide, were separately supplied to the raw material feed port of the same twin-screw extruder as that of Example 1, and were extrusion-molded into a sheet under the operation conditions shown in Table 2. The sheet was cut into a length of 7 cm and was fried at an oil temperature of 170° to 175° C. for two minutes to obtain a snack food. The food exhibited light crunch feeling like that of potato chips, and also offered good taste and flavor.

TABLE 2

| Operation conditions of the twin-screw extruder | |
|---|---|
| Raw material feed | 20 kg/hour (all of the raw materials are measured collectively) |
| Cylinder temperature | 8° C. |
| Dies | Dies shown in the drawings |
| Dies slit (outlet) | 50 mm × 2 mm |
| Temperature at the die end | 160° C. |
| Extrusion speed | 37 cm/min. |
| Drawing speed | 110 cm/min. |

According to the present invention put into practice as described above, only a twin-screw extruder and an accessory cutter need be employed, making it possible to reduce the human labor and scale of the apparatus. Further, there is obtained fish-containing snack which is chiefly composed of fish meat, which exhibits crunch feeling like that of potato chips and which offers particular taste and flavor. Unlike the conventional snack foods consisting chiefly of starches, the novel snack food consisting chiefly of proteins can be efficiently produced and can be provided as proteinous food that is indispensable for the growing children, pregnant women and adults.

What is claimed is:

1. A process for preparing a fish-containing snack food comprising as a first component 100 parts by weight of ground fish meat having a water content of about 80 wt% and as a second component a mixture comprising 8 to 16 parts by weight of soybean proteins and 4 to 9 parts by weight potato powder, in which the said first and said second components are mixed together in advance and are supplied to a feed port of a twin-screw extruder, or said components are separately supplied to the feed port of the twin-screw extruder, and the mixture of said first and said second components is kneaded, compressed, heated just before extrusion from a die associated with said extruder, and the mixture so extruded is fried, wherein the mixture extruded from the die is drawn at a speed faster than the speed of extrusion to reduce the thickness of the mixture extruded, and wherein the die through which the mixture is extruded comprises two circular-shaped inlet ports and a single slit-shaped outlet port, said inlet ports situated opposite to the ends of screws of the twin-screw extruder, said inlet ports being in communication with the outlet port by means of a tunnel defining a Y-shaped flow path wherein the separate flow paths from the inlet ports are combined into one as they run toward the die outlet port, the cross-section of the tunnels ultimately forming a slit.

2. A process for preparing a fish-containing snack food according to claim 1, wherein the soybean proteins are used in an amount of 10 to 14 parts by weight.

3. A process for preparing fish-containing snack food according to claim 1, wherein the mixture to be extruded is heated by heating the ends of dies at 80° to 160° C.

4. A process for preparing fish-containing snack food according to claim 1, wherein the pressure just in front of the dies is 5 to 40 kg/cm².

5. A process for preparing a fish-containing snack food according to claim 1, wherein the mixture to be extruded further comprises starches, and wherein the starches are mixed in an amount of 12 to 16 parts by weight.

6. A process for preparing fish-containing snack food according to claim 1, wherein the ground fish meat is the ground meat of walleye pollack.

7. A process according to claim 1, wherein the mixture to be extruded further contains seasonings and spices.

* * * * *